July 16, 1957
B. G. NEWGEN
2,799,251
TRACTOR HITCH CONTROL DEVICE
Filed Jan. 18, 1954
2 Sheets-Sheet 1
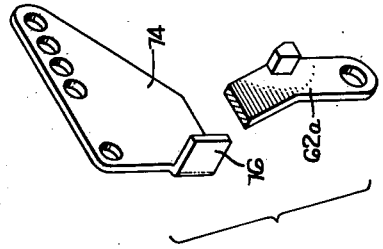
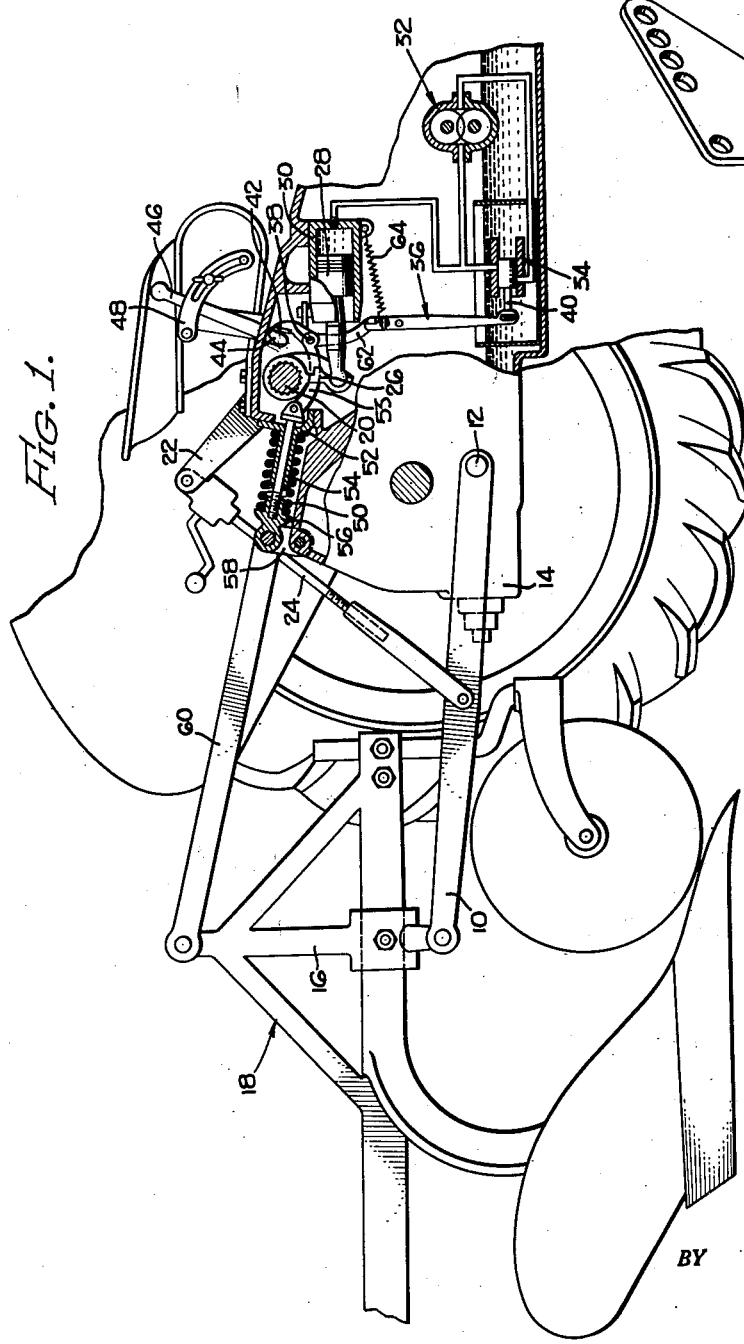
INVENTOR,
BOB G. NEWGEN
BY Lyon & Lyon
ATTORNEYS

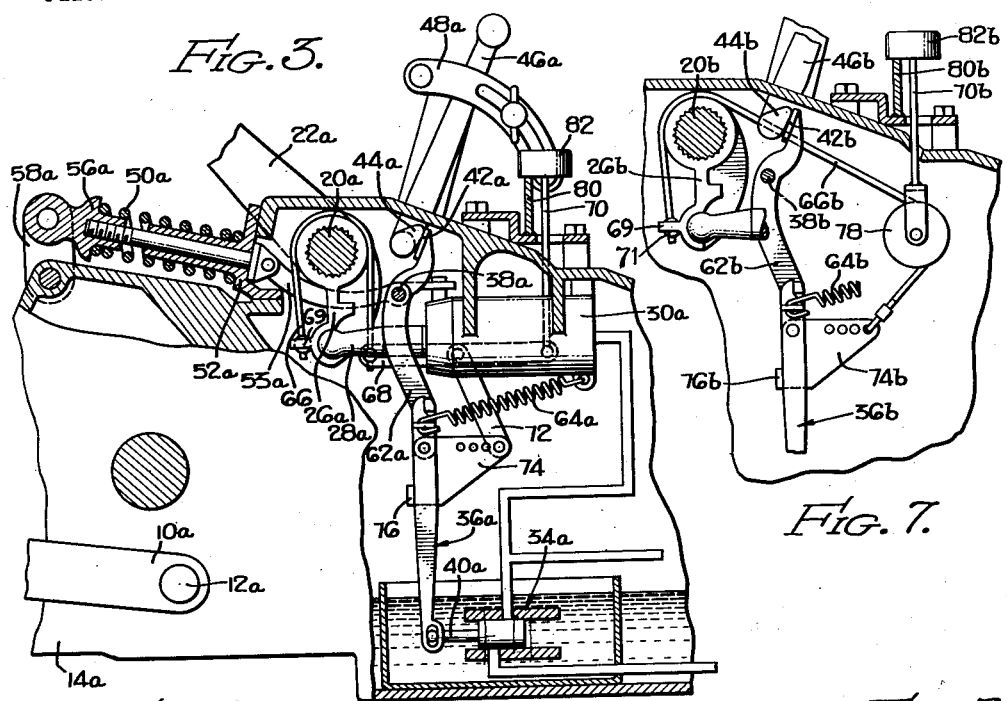

United States Patent Office 2,799,251
Patented July 16, 1957

2,799,251

TRACTOR HITCH CONTROL DEVICE

Bob G. Newgen, Madras, Oreg.

Application January 18, 1954, Serial No. 404,714

4 Claims. (Cl. 121—41)

This invention relates to an improved tractor hitch control mechanism.

The conventional "Ford-Ferguson" tractor hitch is designed particularly to automatically control the depth of ground tilling implements such as plows, cultivators and the like.

It is an object of this invention to provide an improved depth controlling means which functions to more accurately achieve automatic positioning of such implements.

It is a further object of this invention to automatically adjust the depth of other implements such as a carrying box and combine, which when utilized with the "Ford-Ferguson" system necessitates the removal of the top link of the "Ford-Ferguson" linkage.

Other objects and advantages of this invention will be readily apparent from the following description:

In the drawings:

Figure 1 is a fragmentary side elevation partially in section of the "Ford-Ferguson" tractor hitch to which the improvement of this invention is particularly adapted.

Figure 2 is a perspective view of the valve operating linkage.

Figure 3 is a fragmentary partial sectional view of a tractor hitch control device embodying this invention as incorporated in the tractor hitch of Figure 1.

Figure 4 is a view similar to Figure 3 illustrating the mechanism in the fluid supplying position.

Figure 5 is a view similar to Figure 3, with the mechanism in the neutral position.

Figure 6 is a view similar to Figure 3, with the valve in the plow lowering position.

Figure 7 is a diagrammatic view of a modified form of this invention.

Referring now to Figure 1, a brief description of the "Ford-Ferguson" type tractor hitch will be supplied to better understand the improvement of this invention. It is to be understood that the improvement hereinafter set forth may be applicable to other tractor hitches and it is not intended to limit same to this particular hitch.

In the "Ford-Ferguson" hitch the tractor tow is pulled by a tension link 10, the front end of which is pivotally connected to the tractor by a suitable bearing 12. There are two links 10, one on either side of the tractor, attached on either end of the tractor differential housing 14, which extend parallel to one another rearwardly of the tractor and are connected at their rearward ends to the lower portion of an upright leg 16 of a rigid pulling bracket 18 which is mounted on the upper part of an implement towed by the tractor herein illustrated as a plow.

A lift shaft 20 is rotatably mounted transversely of the tractor above and ahead of the bearings 12. Each end of shaft 20 is provided with an arm 22 which is connected by an adjustable strut 24 to one of the links 10 intermediate the ends thereof. An arm 26 is connected to the center portion of and rotates with lift shaft 20. The arm 26 is cup shaped at its lower extremity and receives an enlarged bead formed on one end of piston 28. The piston is reciprocal in a cylinder 30 mounted inside the tractor differential housing. The piston 28 and cylinder 30 constitute a hydraulic ram operating through arm 26 to rotate lift shaft 20 in a clockwise direction. This rotation through arms 22 and struts 24 raises the rear ends of the tension links 10 to raise the bracket 18 and hence regulate the depth of the plow.

Hydraulic fluid under pressure is supplied to the cylinder 30 from a pump 32 through a suitable piston valve 34. This fluid maintains the implement at the desired depth.

A two piece lever, generally indicated 36, is slidably supported by suitable supporting rods 38 and is pivotally connected to valve stem 40 of valve 34. At its upper extremity the lever 36 is provided with an abutment plate 42 which bears against a crank 44 which is rotated by manually operated lever 46 to provide a movable fulcrum for the upper end of the valve controlling lever 36. The lever 46 may be secured in any desired position of adjustment by a suitable quadrant 48.

A coiled compression spring 50 forms the master control spring and is mounted outside the differential housing 14, and its forward end bears against a fixed abutment 52. The control shaft 54 extends through master spring 50 and abutment 52 and is connected at its inner end to the valve controlling lever 36 through link 53. An abutment 56 is carried by the control shaft against which the other extremity of the control spring bears. This abutment is pivotally connected by link 58 to the rear of the differential housing 14 and to the top compression link 60. This link 60 is also pivotally connected to the upright standard 16 of the towing bracket 18.

In operation if the tractor-towed implement digs too deeply into the ground bracket 18 will be moved downwardly and tilted forwardly forcing the top link forwardly compressing master spring 50. Compression of the spring 50 moves the shaft 54 and hence link 53 toward cylinder 30. This moves the upper section 62 of lever 36 freeing the lower section for movement by tension spring 64 in a direction to move the valve stem 40 to a position to communicate cylinder 30 with the outlet side of the hydraulic pump 32. The pump will then force fluid into the cylinder which pressure through piston 28 will rotate shaft 20 in a clockwise direction to raise tension links 10 and hence decrease the depth of the implement.

If the implement is too shallow the compression link 60 will be moved rearwardly by master spring 50 to move the lever 36 in a direction to contact the cylinder with the inlet side of the pump 32, so that relief of fluid from the cylinder will permit the tension links 10 to drop so that the implement will dig more deeply into the ground.

Thus automatic depth control of the ground tilling implement is provided. The depth is regulated by moving the manually operated lever 46, thereby shifting the fulcrum of the upper extremity 62 of lever 36. For example, when the fulcrum is moved away from valve 34 it will require less movement of the compression link 60 to position the valve stem 40 to deliver fluid to cylinder 30 and conversely if the fulcrum is nearing valve 34 greater movement of the compression link 60 will be required to deliver fluid to the cylinder and hence, the implement will operate at a greater depth.

If the top or compression link 60 is removed the master spring 50 will remain in its fully extended condition and there is no follow or compensating movement of link 53, consequently, the automatic control is terminated.

The present invention contemplates automatic positioning when the top link 60 is removed as well as a more sensitive automatic positioning when the top link is utilized.

Referring now to Figures 2 through 5 the "Ford-Ferguson" tractor hitch previously described is illustrated with the improvement of this invention added. Common parts are given the same numerical designation with the addition of the exponent "a."

Attached to the arm 26a is a cable 66 which is looped over shaft 20a and is secured at its other extremity to one end of link 68 passing through slotted lug 69 by footing 71. The other end of link 68 is attached to the manual shift lever 70. Depending from link 68 is a second link 72 which is pivotally mounted thereon. The other extremity of link 72 is pivotally attached to bracket 74 by means of a suitable pin projecting through this link and a selected one of the apertures in the bracket. The bracket 74 is pivotally connected to the lower end of the section 62a of two-piece lever 36a and carries a protuberance 76 which engages the lower section of lever 36a. Thus as the control lever is raised the bracket 74 is rotated counterclockwise till protuberance 76 engages lever 36a at which time rotation of shaft 20a controls the positioning. As the control lever is further raised the lever 36a and hence the fulcrum between its upper and lower sections, is moved towards cylinder 30a requiring a greater movement of cable 66 by means of rotation of shaft 20a, hence movement of tension links 10a to apply fluid to the cylinder 30a and the implement will consequently operate at a greater depth. When the control lever is lowered as in Figure 5 the bracket 74 disengages the lever 36a and the mechanism is rendered inoperative with the conventional "Ford-Ferguson" hitch taking charge if the top link 60 is utilized. Thus a manual positioning system is provided which will function without the compression links 60 or with them giving a more delicate positioning of the implement.

In Figure 7 a modified form of this invention is illustrated wherein like parts are given the same numerical designation with the addition of the exponent "b."

In this embodiment the cable 66b passes over the shaft 20b and passes through pulley 78 and is attached to manual control lever 70b.

In either embodiment as the implement being drawn lowers itself further into the ground the shaft 20a or 20b is rotated counterclockwise through the struts and arms connecting this shaft to the tension links. This counterclockwise rotation pulls cable 66 or 66b rotating bracket 74 or 74b counterclockwise which opens the valve to supply fluid to the cylinder 30a or 30b resulting in the implement being raised by clockwise rotation of shaft 20a or 20b as in the conventional "Ford-Ferguson" tractor hitch.

While for example this invention is used in land planing it is readily apparent that a stop such as 80 can be positioned beneath the knob 82 on the manual control lever 70. Thus, if there is a hump in the field and it becomes necessary to raise the plane to pass over it, the knob can again be lowered to engage the stop thus insuring that the land plane is at the same level. In the "Ford-Ferguson" system there is no simple and sure means of returning the implement to the same level.

While what hereinbefore has been described is the preferred embodiment it is readily apparent that alterations and modifications can be resorted to without departing from the scope of this invention and such alterations and modifications are intended to be included within the scope of the following claims.

I claim:

1. In a tractor of the class described, the combination of: a lift shaft, hydraulic mechanism connected to said lift shaft to rotate same, valve means controlling said hydraulic mechanism, a two-piece lever positioning said valve means, a bracket pivoted to the upper section of said lever furthest from said valve means and releasably engaging the other section of said lever, and means responsive to rotation of said lift shaft to pivot said bracket and pivot the lower section of said lever with respect to the upper section thereof.

2. In a tractor of the class described, the combination of: a lift shaft, hydraulic mechanism connected to said lift shaft to rotate same, valve means controlling said hydraulic mechanism, a two-piece lever positioning said valve means, a bracket pivoted to the upper section of said lever furthest from said valve means and releasably engaging the other section of said lever, and means responsive to rotation of said lift shaft to pivot said bracket and pivot the lower section of said lever with respect to the upper section thereof, and manual control means positioning said two-piece lever with respect to said valve means.

3. In a tractor of the class described, the combination of: a lift shaft, hydraulic mechanism connected to said lift shaft to rotate same, valve means controlling said hydraulic mechanism, a two-piece lever positioning said valve means, a bracket pivoted to the upper section of said lever furthest from said valve means and releasably engaging the other section of said lever, and cable means passing over said lift shaft and responsive to rotation thereof to pivot said bracket and hence the lower section of said two-piece lever with respect to the upper section thereof.

4. In a tractor of the class described, the combination of: a lift shaft, hydraulic mechanism connected to said lift shaft to rotate same, valve means controlling said hydraulic mechanism, a two-piece lever positioning said valve means, a bracket pivoted to the upper section of said lever furthest from said valve means and releasably engaging the other section of said lever, and cable means passing over said lift shaft and responsive to rotation thereof to pivot said bracket and hence the lower section of said two-piece lever with respect to the upper section thereof and manual control means positioning said two-piece lever with respect to said valve means.

References Cited in the file of this patent

UNITED STATES PATENTS

| | | |
|---|---|---|
| 1,779,875 | Christensen | Oct. 28, 1930 |
| 2,356,231 | Ferguson | Aug. 22, 1944 |
| 2,458,325 | Warren | Jan. 4, 1949 |
| 2,477,710 | Worstell | Aug. 2, 1949 |
| 2,586,390 | Schumaier | Feb. 19, 1952 |
| 2,722,873 | Garmager | Nov. 8, 1955 |